(12) United States Patent
Bryant et al.

(10) Patent No.: US 9,591,796 B2
(45) Date of Patent: Mar. 14, 2017

(54) WALK AERATOR

(71) Applicant: Exmark Mfg. Co., Inc., Beatrice, NE (US)

(72) Inventors: Christian S. C. Bryant, Lincoln, NE (US); Alex W. Buhr, Filley, NE (US); Timothy D. Andre, Firth, NE (US); Jeremy J. Tate, Beatrice, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 15/004,254

(22) Filed: Jan. 22, 2016

(65) Prior Publication Data

US 2016/0135352 A1    May 19, 2016

Related U.S. Application Data

(62) Division of application No. 14/056,579, filed on Oct. 17, 2013, now Pat. No. 9,241,437.

(51) Int. Cl.
| | |
|---|---|
| *A01B 45/02* | (2006.01) |
| *A01B 63/00* | (2006.01) |
| *A01B 76/00* | (2006.01) |
| *B60K 11/06* | (2006.01) |
| *B60K 11/08* | (2006.01) |

(52) U.S. Cl.
CPC ............ *A01B 45/02* (2013.01); *A01B 45/026* (2013.01); *A01B 63/008* (2013.01); *A01B 76/00* (2013.01); *B60K 11/06* (2013.01); *B60K 11/08* (2013.01)

(58) Field of Classification Search
CPC ..... A01B 45/02; A01B 45/023; A01B 33/082; A01B 45/026; A01B 33/08; A01B 63/008; A01B 76/00; B60K 11/06; B60K 11/08

See application file for complete search history.

(56) References Cited

U.S. PATENT DOCUMENTS

| | | | | |
|---|---|---|---|---|
| 4,969,533 A * | 11/1990 | Holm | ................... | B62D 21/186 180/273 |
| 5,119,744 A * | 6/1992 | Comer | ................... | A01B 45/02 111/127 |
| 5,119,880 A * | 6/1992 | Zehrung, Jr. | ........ | A01B 45/026 172/22 |
| 5,398,767 A * | 3/1995 | Warke | ................. | A01B 45/023 172/125 |
| 6,434,918 B1 * | 8/2002 | Csonka | ................... | A01D 34/82 56/12.8 |
| 6,708,773 B1 * | 3/2004 | Kinkead | .............. | A01B 45/026 172/21 |

(Continued)

*Primary Examiner* — Jamie L McGowan
(74) *Attorney, Agent, or Firm* — James W. Miller (57) ABSTRACT

A walk aerator comprises a housing supported by a plurality of wheels that include a pair of drive wheels. The drive wheels are pivotally mounted to the housing to permit the housing to move between operational and transport positions thereof. A control is used to so move the housing with the control having a hand grip whose height above the ground is easily adjustable to accommodate users of different effective heights. A foot guard maintains a relatively constant disposition relative to the ground whether the housing is in its operational or transport position. The housing of the aerator has a vent system and an air gap relative to a prime mover deck which cool a traction drive system contained within the housing.

11 Claims, 8 Drawing Sheets

(56) References Cited

U.S. PATENT DOCUMENTS

| | | | |
|---|---|---|---|
| 8,336,282 B2* | 12/2012 | Messina | A01D 34/008 56/320.1 |
| 8,800,677 B2* | 8/2014 | Georgoulias | A01B 79/005 172/2 |
| 8,827,000 B2* | 9/2014 | Aldridge | A01B 79/005 172/2 |
| 8,844,645 B2* | 9/2014 | Hall | A01B 45/023 172/125 |
| 8,925,643 B2* | 1/2015 | Georgoulias | A01B 45/023 172/21 |
| 8,955,610 B1* | 2/2015 | Longmeyer | A01B 45/023 172/125 |
| 2003/0178208 A1* | 9/2003 | Abenroth | A01B 33/028 172/42 |
| 2005/0006110 A1* | 1/2005 | Wessel | A01B 45/023 172/22 |
| 2006/0070750 A1* | 4/2006 | Classen | A01B 33/082 172/22 |
| 2008/0099262 A1* | 5/2008 | Phillips | A01D 69/02 180/68.2 |
| 2013/0075117 A1* | 3/2013 | Hall | A01B 45/023 172/22 |
| 2013/0255979 A1* | 10/2013 | Georgoulias | A01B 63/008 172/22 |

* cited by examiner

WALK AERATOR

TECHNICAL FIELD

This invention relates to the field of outdoor power equipment and, more particularly, to a self-propelled walk aerator for soil aeration.

BACKGROUND OF THE INVENTION

Walk aerators having various types of ground engaging, soil aerating tools are known for soil aeration. Such aerators are operated by users who grip an upwardly and rearwardly extending handle assembly and walk on the ground behind the aerator during a soil aeration operation. Instead of walking on the ground, the user may be supported on an optional wheeled sulky attached to the aerator. In either case, the aerator is usually self-propelled over the ground by a traction drive system powered by a prime mover mounted on the aerator. While such aerators are effective in aerating smaller areas of turf, they have a number of shortcomings.

For one thing, certain aerator traction drive systems may include one or more transmissions, including hydrostatic or electric drive transmissions, which are substantially enclosed within the housing of the aerator to protect the drives and guard them from the user. The Applicants have found that such traction drive systems experience restricted air flow in certain circumstances which may lead to overheating of such drive systems. In addition, the user must generally be careful to not inadvertently extend his or her feet beneath the lower edge of the housing into contact with the aerating tools. Finally, various operational controls carried on the handle assembly of the aerator may be at less than optimal heights for a particular user given the differences in the anatomic heights of different users and whether a particular user is walking on the ground or is being transported on the sulky during a soil aeration operation. Accordingly, it would be an advance in the aerator art to overcome such shortcomings.

SUMMARY OF THE INVENTION

One aspect of this invention relates to a walk aerator for soil aeration of the ground. The aerator comprises a housing supported for rolling over the ground by a plurality of ground engaging wheels. The housing has an upwardly extending handle assembly which is capable of being gripped by a user who walks on the ground during operation of the aerator. A prime mover is carried on the housing for providing power. A plurality of aerating tools are movably carried on the housing and are operatively connected to the prime mover, the aerating tools engaging the ground and creating soil aeration openings in the ground as the housing rolls over the ground. At least one of the ground engaging wheels is pivotally connected to the housing for pivotal up and down movement of the housing relative to the at least one ground engaging wheel between an operational housing position in which the housing is lowered relative to the ground such that the aerating tools carried on the housing are able to engage the ground and perform soil aeration during movement of the housing over the ground and a transport housing position in which the housing is raised relative to the ground such that the aerating tools carried on the housing are held up out of contact with the ground and are unable to perform soil aeration during movement of the housing over the ground. A control is provided comprising a hand grip secured to at least one arm with the at least one arm being pivotally connected to the handle assembly for pivotal up and down movement of the control on the handle assembly. The control is operatively connected to an actuating linkage that extends to the at least one pivotal ground engaging wheel for moving or permitting movement of the housing between the operational and transport housing positions thereof and vice versa as the control pivots in opposite directions on the handle assembly. The hand grip and the at least one arm are selectively adjustable relative to one another by selectively moving the hand grip to different positions on the at least one arm to selectively adjust the height of the hand grip relative to the ground to accommodate users having different effective heights relative to the ground.

Another aspect of this invention relates to a walk aerator for soil aeration of the ground. The aerator comprises a housing supported for rolling over the ground by a plurality of ground engaging wheels. The housing has an upwardly extending handle assembly which is capable of being gripped by a user who walks on the ground during operation of the aerator. A prime mover is carried on the housing for providing power. A plurality of aerating tools are movably carried on the housing and are operatively connected to the prime mover, the aerating tools engaging the ground and creating soil aeration openings in the ground as the housing rolls over the ground. At least one of the ground engaging wheels is rotatably journalled on an arm with the arm being pivotally mounted on the housing for pivotal up and down movement of the housing relative to the at least one ground engaging wheel between an operational housing position in which the housing is lowered relative to the ground such that the aerating tools are able to engage the ground and perform soil aeration during movement of the housing over the ground and a transport housing position in which the housing is raised relative to the ground such that the aerating tools are held up out of contact with the ground and are unable to perform soil aeration during movement of the housing over the ground. At least one laterally extending foot guard is positioned between the aerating tools and the user's feet when the user is walking on the ground and gripping the handle assembly to help prevent the user's feet from inadvertently contacting the aerating tools. The at least one foot guard is operatively connected to the pivotal arm and thereby to the at least one ground engaging wheel to maintain an approximately constant disposition relative to the ground whether the housing is lowered relative to the ground in the operational housing position or is raised relative to the ground in the transport housing position.

Yet another aspect of this invention relates to a walk aerator for soil aeration of the ground. The aerator comprises a housing supported for rolling over the ground by a plurality of ground engaging wheels. The housing has an upwardly extending handle assembly which is capable of being gripped by a user who walks on the ground during operation of the aerator. The housing has a downwardly opening cavity. A prime mover is carried on the housing for providing power. A plurality of aerating tools are movably carried on the housing within a first section of the cavity and are operatively connected to the prime mover, the aerating tools engaging the ground and creating soil aeration openings in the ground as the housing rolls over the ground. At least one air cooled traction drive is located within a second section of the cavity. The at least one drive is operatively coupled to the prime mover and to at least one of the ground engaging wheels to self-propel the housing over the ground. The housing contains various vents therein in communication with the second section of the cavity to provide sufficient air flow both into and out of the second section of the cavity to adequately cool the drive.

BRIEF DESCRIPTION OF THE DRAWINGS

This invention will be described in detail hereafter in the Detailed Description, when taken in conjunction with the following drawings, in which like reference numerals refer to like elements throughout.

DETAILED DESCRIPTION

Figure 1:
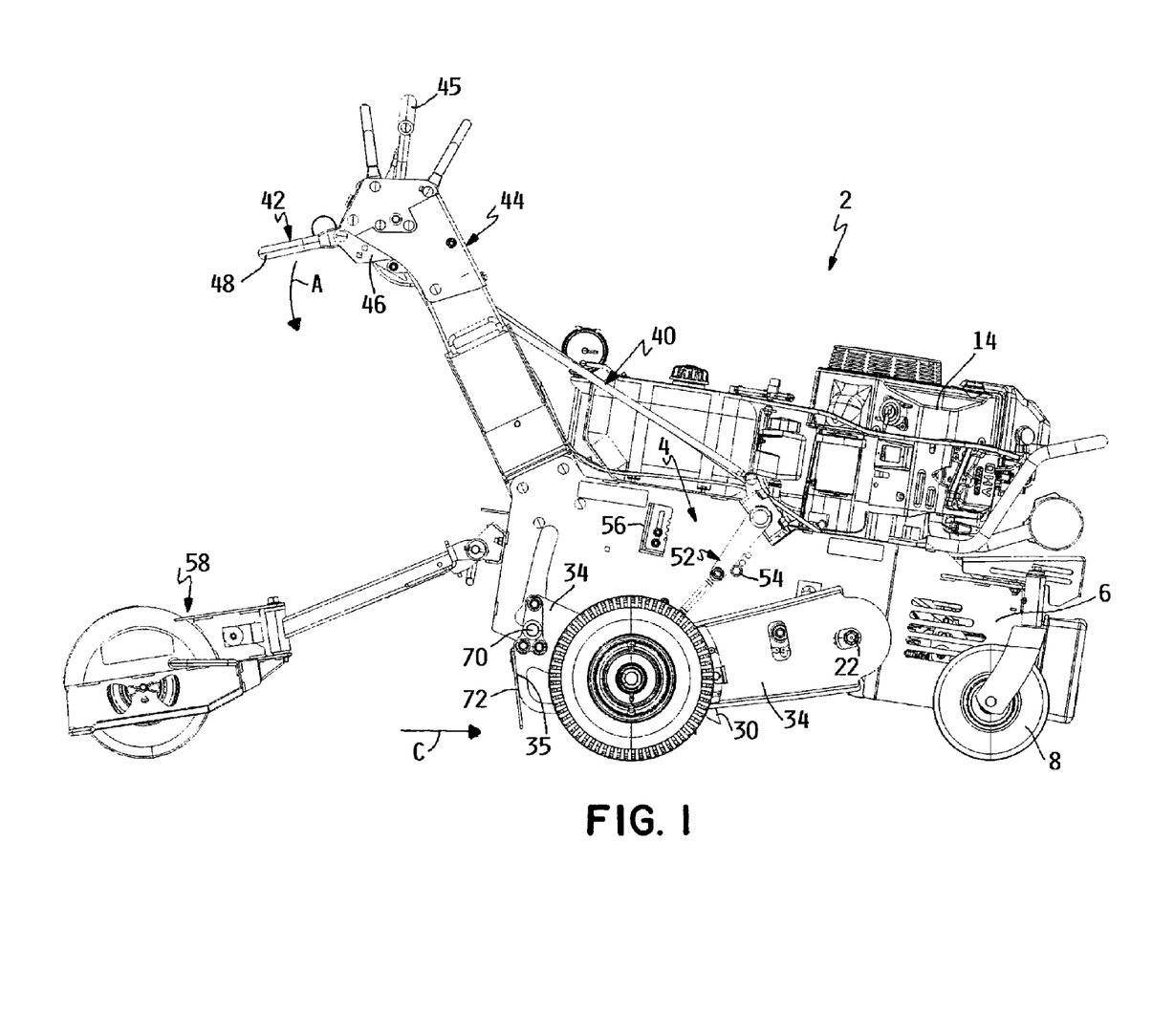
FIG. 1 is a side elevational view of an aerator according to one embodiment of this invention, particularly illustrating an optional ride on sulky attached to the rear of the aerator housing as well as illustrating the rear drive wheels in the transport position of the housing with the housing of the aerator having been raised relative to the ground such that the aerating tools are held up out of contact with the ground such that no soil aeration takes place as the housing moves over the ground.
Figure 2:
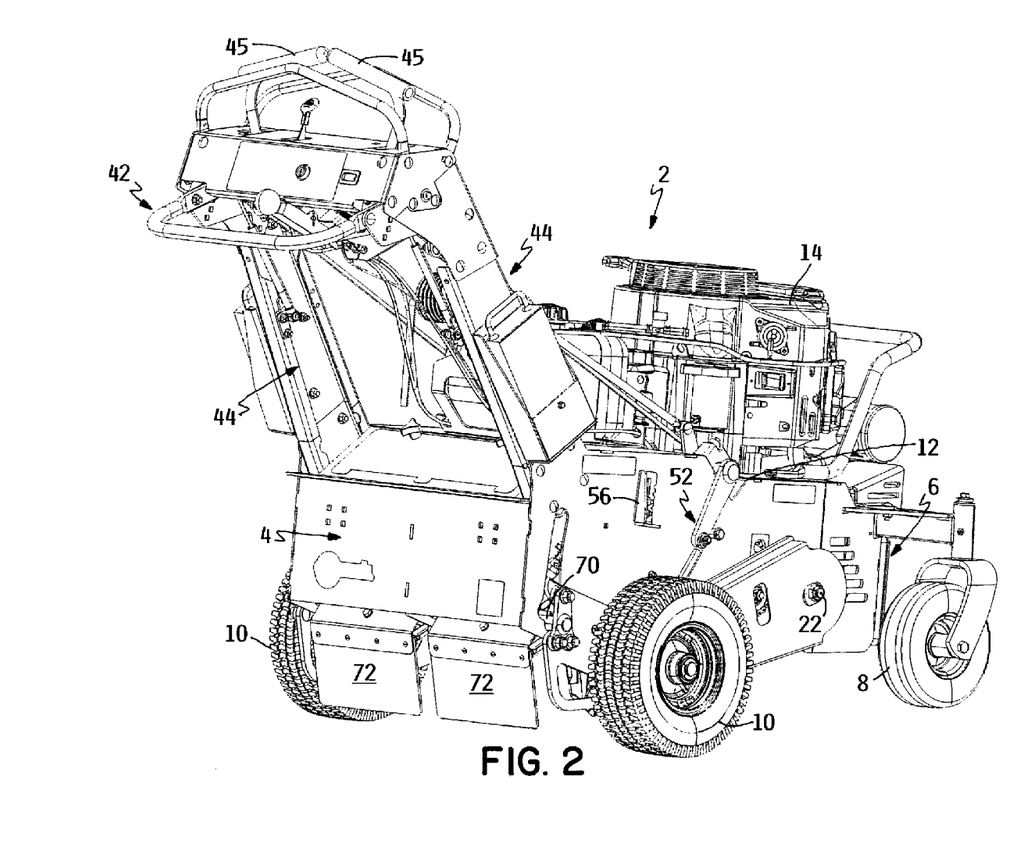
FIG. 2 is a perspective view of the aerator of FIG. 1, but with the optional sulky and its mounting hardware removed from the aerator housing for the purpose of clarity.

Referring first to FIGS. 1 and 2, a walk aerator according to this invention is illustrated generally as 2. Aerator 2 comprises a substantially rectangular housing 4 having an inwardly tapered, truncated, V-shaped front end 6. Housing 4 is movably supported for rolling over the ground by a pair of front caster wheels 8 and a pair of rear drive wheels 10. A portion of a top wall of housing 4 forms a prime mover deck 12 that mounts a prime mover 14 thereon. Prime mover 14 preferably comprises an internal combustion engine, but may comprise an electric motor or other suitable power generating device.

Figure 3:
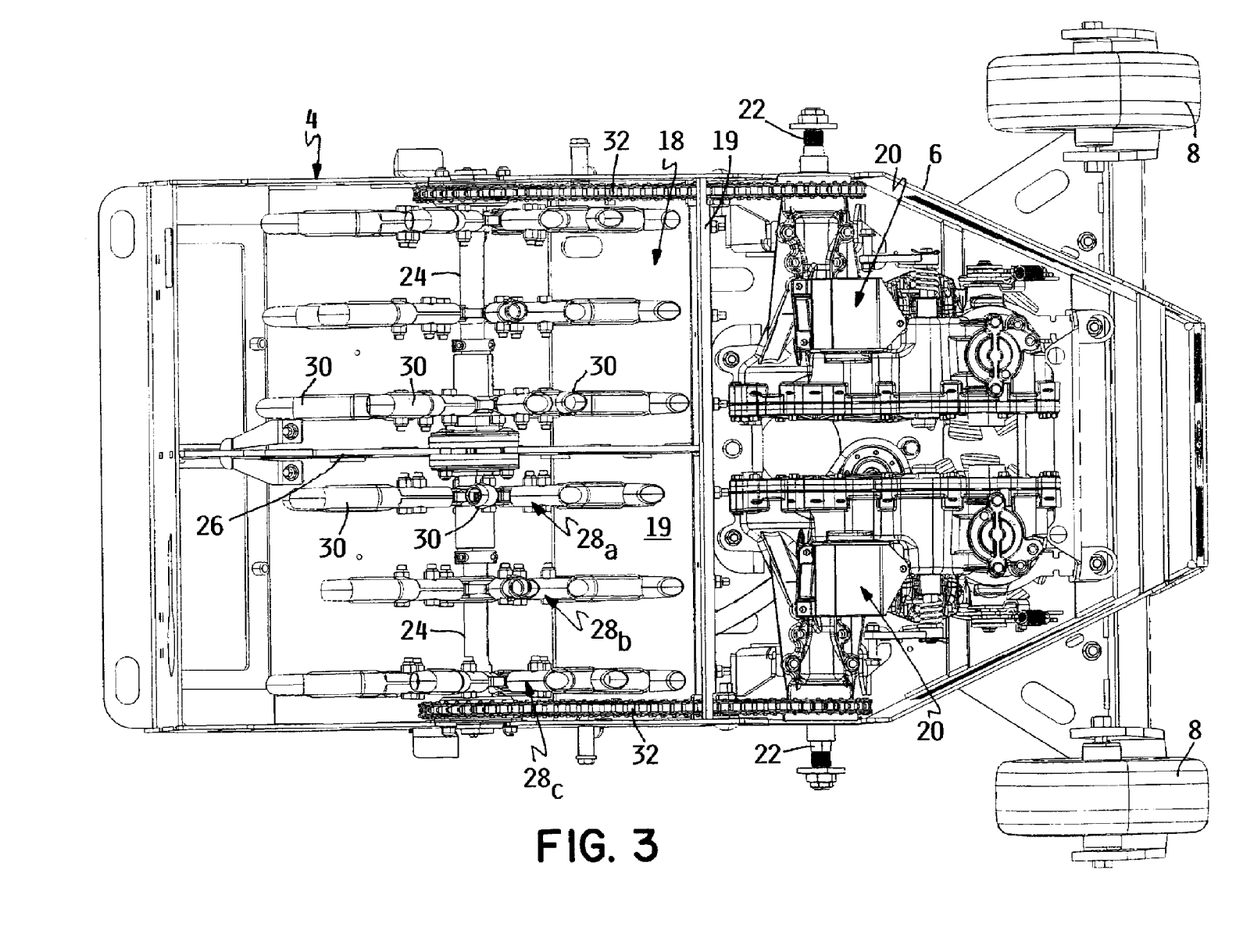
FIG. 3 is a bottom plan view of the aerator as shown in FIG. 2, but with the trailing arms and the rear drive wheels further removed for the sake of clarity.

Referring now to FIG. 3, housing 4 defines a substantially enclosed, downwardly opening cavity 18. Cavity 18 is divided into a first front section and a second rear section by cross wall 19. The front section of cavity 18 houses a traction drive system that in one embodiment comprises a pair of side-by-side hydrostatic drives 20. Drives 20 are independent from each other. Each drive 20 comprises an integrated hydraulic pump and hydraulic motor although the pump and motor of each drive 20 could be separate from one another if so desired. Each drive 20 has a laterally extending, rotary drive shaft 22 that extends outwardly through an opening in an adjacent side wall of housing 4. Other embodiments of the traction drive system may include a single hydrostatic transmission or transaxle, single or dual mechanical transmissions or transaxles, single or dual electrical motors, belt drive systems, and the like.

The rear section of cavity 18 houses two side-by-side rotor shafts 24 which are also independent of one another. Each rotor shaft 24 is rotatably journalled at one end in an adjacent side wall of housing 4 and at the other end in a longitudinally extending, central partition 26 in the rear section of cavity 18. Three ground aerating tools $28_a$-$28_c$ are mounted to each rotor shaft 24 in a laterally spaced orientation relative to one another. The middle tool $28_b$ and the laterally outermost tool $28_c$ are secured or fixed to rotor shaft 24 to be positively driven by rotor shaft 24. The laterally innermost tool $28_a$ in each set of three tools 28 is mounted on rotor shaft 24 in a freewheeling manner to be driven only by contact with the ground as housing 4 moves over the ground.

In one embodiment, each tool 28 comprises a disc that mounts a plurality of vertically extending, circumferentially spaced, substantially cylindrical aerating tines 30. Tines 30 will punch holes in the ground to aerate the soil as rotor shaft 24 and thus tools 28 are rotated about the substantially horizontal axis formed by rotor shaft 24. Tines 30 may be hollow to pull up and eject a soil core after the hole is punched or may be solid so that no soil core is pulled up out of the ground. A chain drive 32 operatively couples each rotor shaft 24 to drive shaft 22 of drive 20 on the same side of housing 4 such that rotation of drive shaft 22 of drive 20 rotates the corresponding rotor shaft 24. Other types of aerating tools may be used in place of tools 28 that use tines 30, such as turf slicing blades which create narrow slits in the ground as the soil aeration openings rather than the holes that are created by tines 30.

Figure 4:
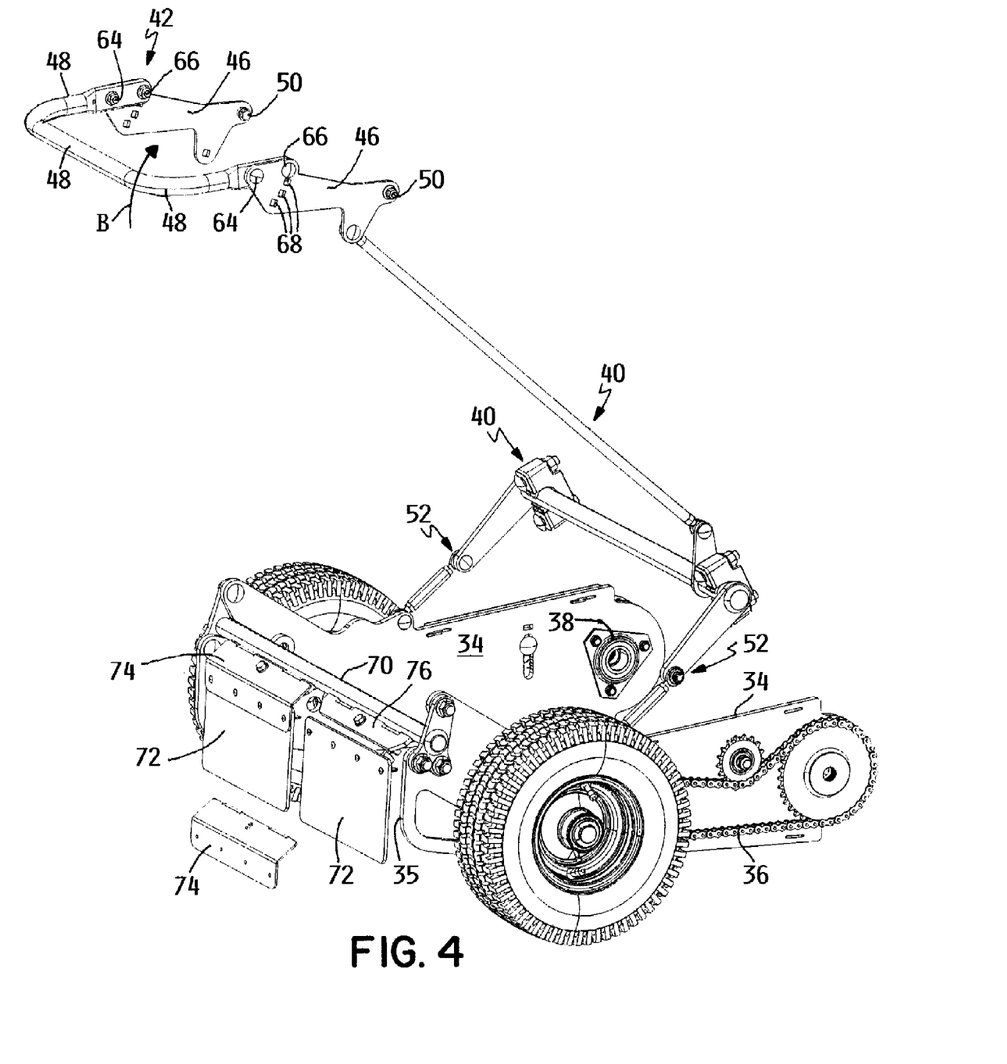
FIG. 4 is a perspective view of a portion of the aerator as shown in FIG. 2, particularly illustrating the trailing arms, the rear drive wheels, the adjustable control that is used to move the housing between a transport position and an operational position, and the actuating linkage that connects the control to the trailing arms.

Rear drive wheel 10 on each side of housing 4 is also driven by drive 20 on the same side of housing 4. As best shown in FIG. 4, a pair of trailing arms 34 is provided with each rear drive wheel 10 being journalled for rotation on one trailing arm 34. Each drive wheel 10 carried on each trailing arm 34 is positioned slightly ahead of the rear end of trailing arm 34. Trailing arm 34 also carries a chain drive 36 that operatively couples each rear drive wheel 10 to drive shaft 22 of drive 20 on the same side of housing 4 such that rotation of drive shaft 22 of drive 20 rotates the corresponding rear drive wheel 10. Thus, drive wheels 10 are powered by drives 20 in an independent fashion to self-propel housing 4 which makes it capable of a zero radius turn (ZRT). Trailing arms 34 and drive wheels 10 mounted thereon are located laterally outboard of opposite sides of housing 4.

Figure 8:
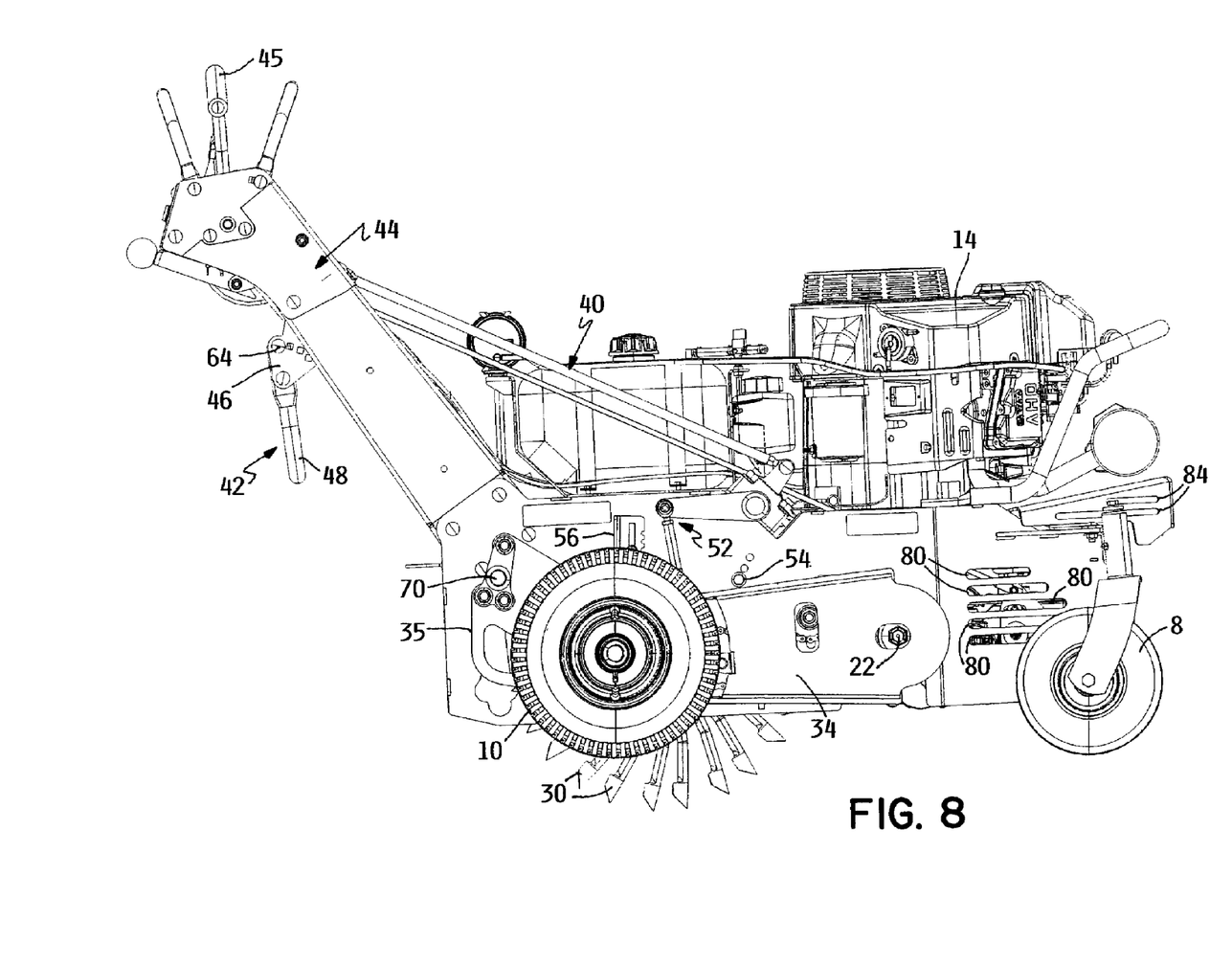
FIG. 8 is a perspective view similar to FIG. 1 but with the optional sulky and its mounting hardware removed therefrom, particularly illustrating the rear drive wheels in the operational position of the housing with the housing of the aerator having been lowered relative to the ground such that the aerating tools are in contact with the ground such that soil aeration takes place as the housing moves over the ground.

The front end of each trailing arm 34 carries a bearing 38 that is non-rotatably received on drive shaft 22 of drive 20 on the adjacent side of housing 4, i.e. drive shaft 22 is able to rotate within bearing 38. This permits housing 4 to have a pivoting up and down motion relative to trailing arms 34 and relative to the ground. During this pivoting action, housing 4 moves between a raised transport position and a lowered operational position. In the transport position as shown in FIG. 1, the rear of housing 4 has pivoted upwardly away from the ground by a sufficient distance that the tines 30 of aerating tools 28 are lifted up and held out of contact with the ground so that no soil aeration occurs as housing 4 is self-propelled over the ground. In the operational position as shown in FIG. 8, the rear of housing 4 has pivoted downwardly towards the ground into a position that is close enough to the ground such that the weight of housing 4 bears on aerating tools 28 to force tines 30 into the ground to an aerating depth to perform soil aeration as housing 4 is self-propelled over the ground.

An actuating linkage, indicated generally as 40 in FIG. 4, is provided for moving housing 4 between its transport and operational positions. Actuating linkage 40 extends between trailing arms 34 and a pivotal control 42 that is carried on an upwardly and rearwardly extending handle assembly 44 provided on the rear of housing 4. Control 42 has a pair of laterally spaced, forwardly extending arms 46 which carry or mount a transversely extending hand grip 48 between them. Arms 46 are pivotally coupled to the laterally spaced uprights of handle assembly 44 for pivoting of control 42 on handle assembly 44 about a substantially horizontal pivot axis defined by pivot pins 50 at the front end of arms 46. While control 42 has a pair of arms 46 such that control 42 is generally depicted in the form of a U-shaped bail, this particular shape of control 42 could be varied. For example, control 42 could comprise a hand grip 48 carried on a single arm 46 in either an L-shaped or linear shaped configuration or the like.

When control 42 is in the position shown in FIGS. 1, 2 and 4, actuating linkage 40 has been placed in a first configuration that disposes housing 4 in its transport position. In this first configuration, overcenter portions 52 of actuating linkage 40 have been placed into an overcenter disposition in abutment with stops 54 on the side walls of housing 4. If the user pushes down on control 42 to pivot control 42 downwardly as shown by the arrow A in FIG. 4, actuating linkage 40 is moved into a second configuration in which the overcenter disposition of overcenter portions 52 of actuating linkage 40 has been collapsed as shown in FIG. 8. This permits the rear of housing 4 to drop down relative to drive wheels 10 until trailing arms 34 abut against the underside of depth control brackets 56 placed on the side walls of housing 4, provided that the ground is soft enough and/or there is enough weight on housing 4 to allow tines 30 of aerating tools 28 to penetrate to the desired depth. This is the operational position of housing 4 as shown in FIG. 8. The actual depth of penetration can be adjusted by moving depth control brackets 56 vertically up and down on the side walls of housing 4.

Aerator 2 described heretofore in this Detailed Description is generally known in prior art that would be available as a prior art reference to this application. For example, the 24" Dual Hydro Aerator previously manufactured, built and sold by Lawn Solutions Commercial Products, Inc. of Louisville, Ky. generally conforms to aerator 2 described heretofore in this Detailed Description. Accordingly, the Applicants will turn now to a description of various structure and features that are patentable over the aforesaid 24" Dual Hydro Aerator of Lawn Solutions Commercial Products, Inc.

Referring again to FIG. 1, aerator 2 of this invention is a walk aerator that is operated by a user who walks on the ground behind housing 4, though the aerator could be of a type in which handle assembly 4 extends upwardly and forwardly from the front of housing 4 such that the user walks on the ground ahead of housing 4. In addition, when the aerator is a walk behind aeration, an optional sulky 58 may be coupled to the rear of housing 4 to allow the user to stand on sulky 58 and ride on sulky 58 instead of walking on the ground. However, this means that the vertical height of control 42 above the ground may not be ergonomically suited to a particular user. This may be due to the fact that the particular user is much shorter or taller than an average sized person. Or, it may be due to the fact that the particular user has chosen to ride on optional sulky 58 rather than walk on the ground, thus effectively changing the height of the user relative to the ground. Thus, it would be advantageous to be able to easily adjust the height of control 42 to raise or lower hand grip 48 of control 42 relative to the ground to accommodate changes in the effective height of a particular user. Effective height is defined herein as encompassing the particular user's anatomic height (i.e. a user of short, average, or tall height) as well as the actual height of a particular user above the ground (i.e. whether the user is walking on the ground or riding on sulky 58).

To achieve this result, arms 46 of control 42 are pivotally joined to hand grip 48 by aligned pivot bolts 64 that form a common, substantially horizontal, pivot axis. A locking bolt 66 is received in any single hole 68 in an arcuate array of vertically spaced locking holes 68 provided on each arm 46 to lock or securely hold hand grip 48 in a selected angularly adjusted position relative to arms 46. For example, locking bolts 66 are shown in FIG. 4 as passing through the uppermost locking holes 68 which establishes the lowest position of hand grip 48 relative to the ground. To raise the height of hand grip 48, locking bolts 66 are removed from the uppermost holes 68 in both arms 46, hand grip 48 is then pivoted upwardly relative to arms 46 about pivot bolts 64 in the direction of the arrow B in FIG. 4, and locking bolts 66 are then reinserted into a different one of the lower locking holes 68 in each arcuate array of holes 68. Each progressively lower hole 68 provides an incrementally and progressively higher position of hand grip 48 relative to the ground until the highest hand grip position is achieved when the lowest locking hole 68 is used. Accordingly, a user of aerator 2 may easily adjust the height of hand grip 48 of control 42 above the ground to suit the effective height of the user. This adjustment can be made without disturbing the overall inclination of handle assembly 44 and the other operational controls carried on handle assembly 44, such as the twin sticks 45 that control the independent drives 20, and without disturbing the pre-adjusted length of actuating linkage 40.

Easy adjustment of hand grip 48 is also important for another reason. The trailing arms 34 and actuating linkage 40 have been designed to provide a lift force versus travel of control 42 diagram that is in the form of a bell shaped curve. This means that the force required by the user to move control 42 is lowest at the start and finish of lowering or lifting housing 4 and builds to a peak at the mid-stroke position of control 42. This allows the user to start movement of control 42 with a low force and to advantageously use the momentum of the components to more easily lower or lift housing 4 through the position at which the peak force is required. Desirably, control 42 should be adjusted so that the mid-stroke position of the control corresponds to a position of hand grip 48 at approximately the user's midsection or waist. This places the user's body in the most ergonomically correct position to apply peak lift force to hand grip 48 with the least strain on the user's body. The adjustable height of hand grip 48 as described earlier ensures that the user can easily adjust hand grip 48 to be adjacent the user's mid-section or waist at the mid-stroke position of control 42 to take advantage of the lift force versus travel curve that is designed into trailing arms 34 and actuating linkage 40.

Another desirable feature of aerator 2 is illustrated in FIG. 4. The rear ends of trailing arms 34 are connected to one another by a laterally extending cross member 70. Two flexible guards 72 in the form of rubber flaps are bolted by L-shaped attaching flanges 74 to rearwardly extending mounting plates 76 on cross member 70. FIG. 4 illustrates one such guard 72 so attached with the L-shaped attaching flange 74 for the other guard 72 having been exploded away from mounting plate 76 on cross member 70 for the purpose of clarity. However, when both such guards 72 are so attached, guards 72 depend or hang substantially vertically downwardly from cross member 70, though such guards 72 may be slightly inclined relative to vertical, and terminate slightly above the ground in the transport position of housing 4. See FIG. 1. Guards 72 are located laterally inside of the side walls of housing 4 so that guards 72 will be disposed mostly wholly within housing 4 when housing 4 is in its operational position as shown in FIG. 8. Other embodiments may include guards 72 that are always located outside of housing 4. In addition, non-flexible guards or flexible guards made from materials other than rubber could also be used.

In addition, as also shown in FIG. 1, trailing arms 34 have rearward extensions that extend far enough rearwardly that the rear edges 35 of trailing arms 34 are substantially longitudinally aligned with guards 72, are disposed substantially in the same substantially vertical or slightly inclined orientation as guards 72, and extend downwardly over a majority of the vertical height of guards 72. Guards 72 collectively extend across a substantial majority of the width of housing 4 of aerator 2. Instead of two guards 72, one longer guard 72 could be provided or three or more shorter guards 72 could be provided as long as they collectively protect the operator's feet. Guards 72 and the rearward extensions of trailing arms 34 that terminate in rear edges 35 may be utilized in conjunction or independently of each other. In addition, guards 72 could be extended to act in place of the rear edges 35 and the rearward extensions of the trailing arms 34. Moreover, rear edges 35 may be extended transversely across the rear of the machine to form the guards 72 rather than using separate guards 72.

Guards 72, and to a lesser extent the extension of trailing arms 34 that cause the rear edges 35 of trailing arms 34 to meet and be aligned with guards 72, help protect the feet of the user of aerator 2 from inadvertently coming into contact with any of tines 30 of aerating tools 28 when tines 30 are in operation. Guards 72 substantially reduce the potential of the user's feet from coming into contact with tines 30 in a longitudinal direction (represented by the arrow C in FIG. 1). In addition, the rearward extension of trailing arms 34 as described above decreases the possibility that a user could insert his or her foot from the side in the space behind drive wheel 10 and the adjacent guard 72 in a manner that might lead to contact with tines 30 from the side.

Securing guards 72 to cross member 70 that connects trailing arms 34 is advantageous as guards 72 will always have the same approximate or general disposition relative to the ground throughout the entire range of motion of housing 4 between its transport position and its lowest operational position. This substantially constant disposition of guards 72 relative to the ground is a result of guards being carried by the trailing arms 34 that carry drive wheels 10 rather than rigidly affixing guards 72 directly to housing 4 of aerator 2. Thus, the vertical spacing between guards 72 and the ground remains constant relative to the ground even though the height of the rear of the housing above the ground significantly lowers between the transport position and the lowest operational position.

Figure 5:
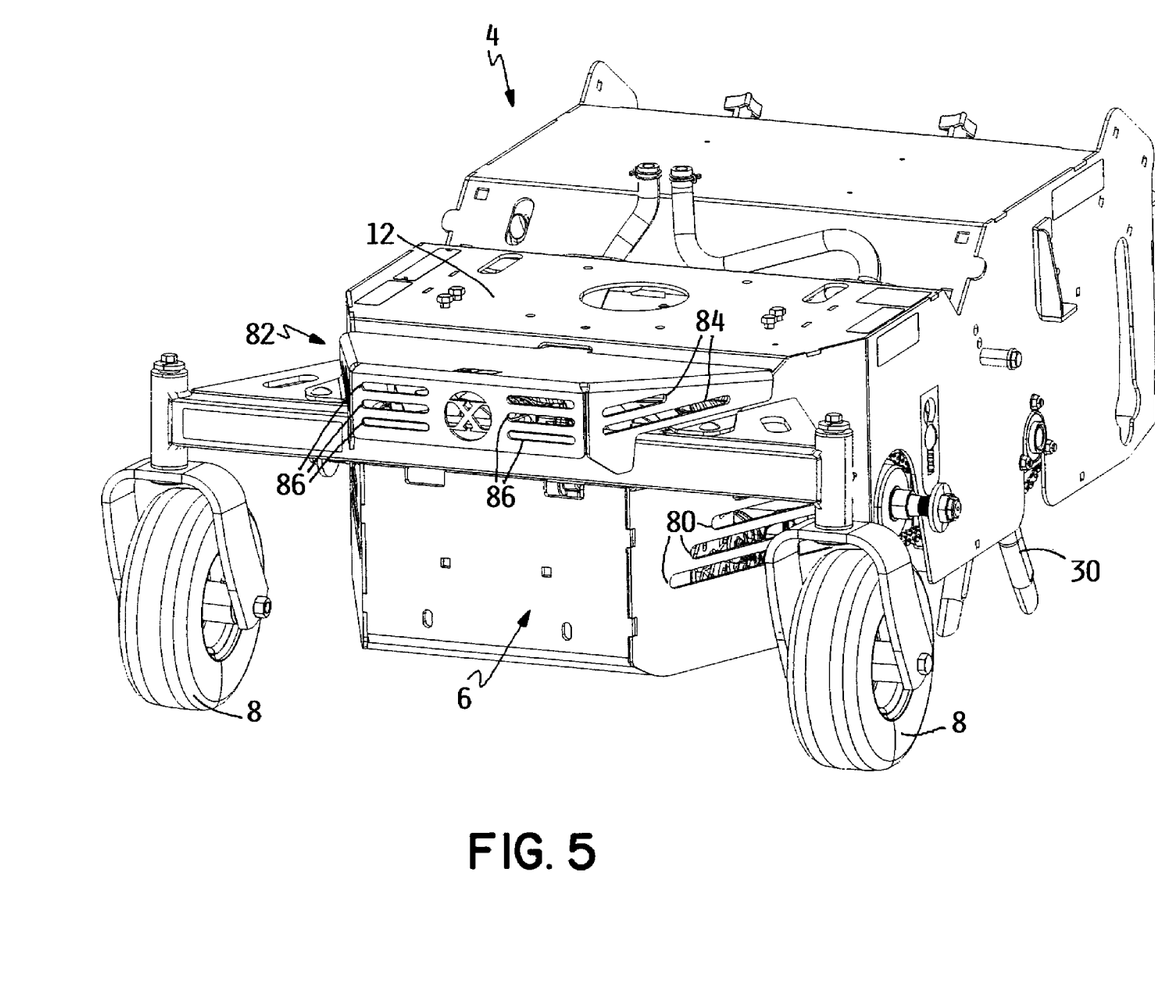
FIG. 5 is a front perspective view of the portion of the aerator shown in FIG. 4, particularly illustrating a system of cooling vents provided in the aerator housing for cooling the traction drives contained within a front portion of an internal cavity in the housing.
Figure 6:
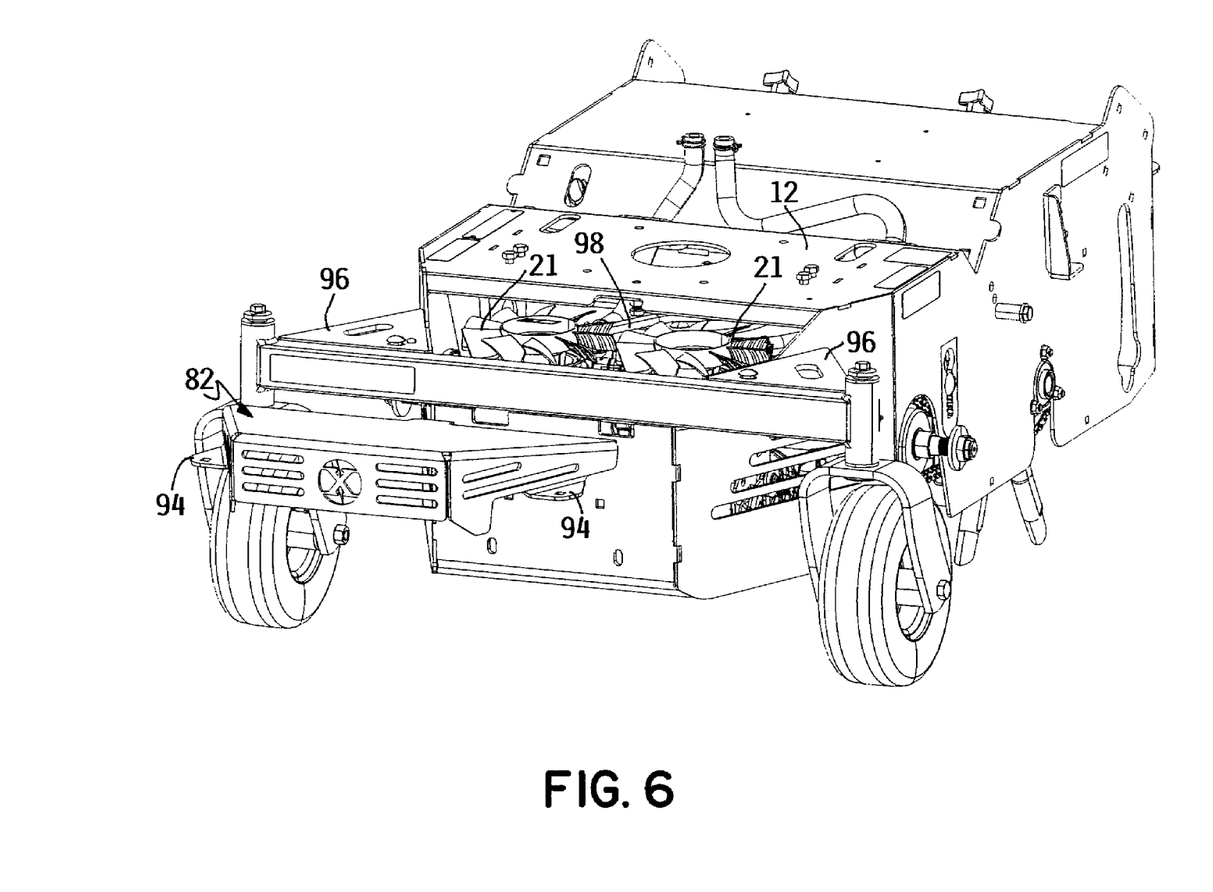
FIG. 6 is a front perspective view similar to FIG. 5, particularly illustrating that a hood portion of the housing that carries some of the cooling vents is easily removable from the housing to provide access to the belt drive(s) used to power the traction drives.
Figure 7:
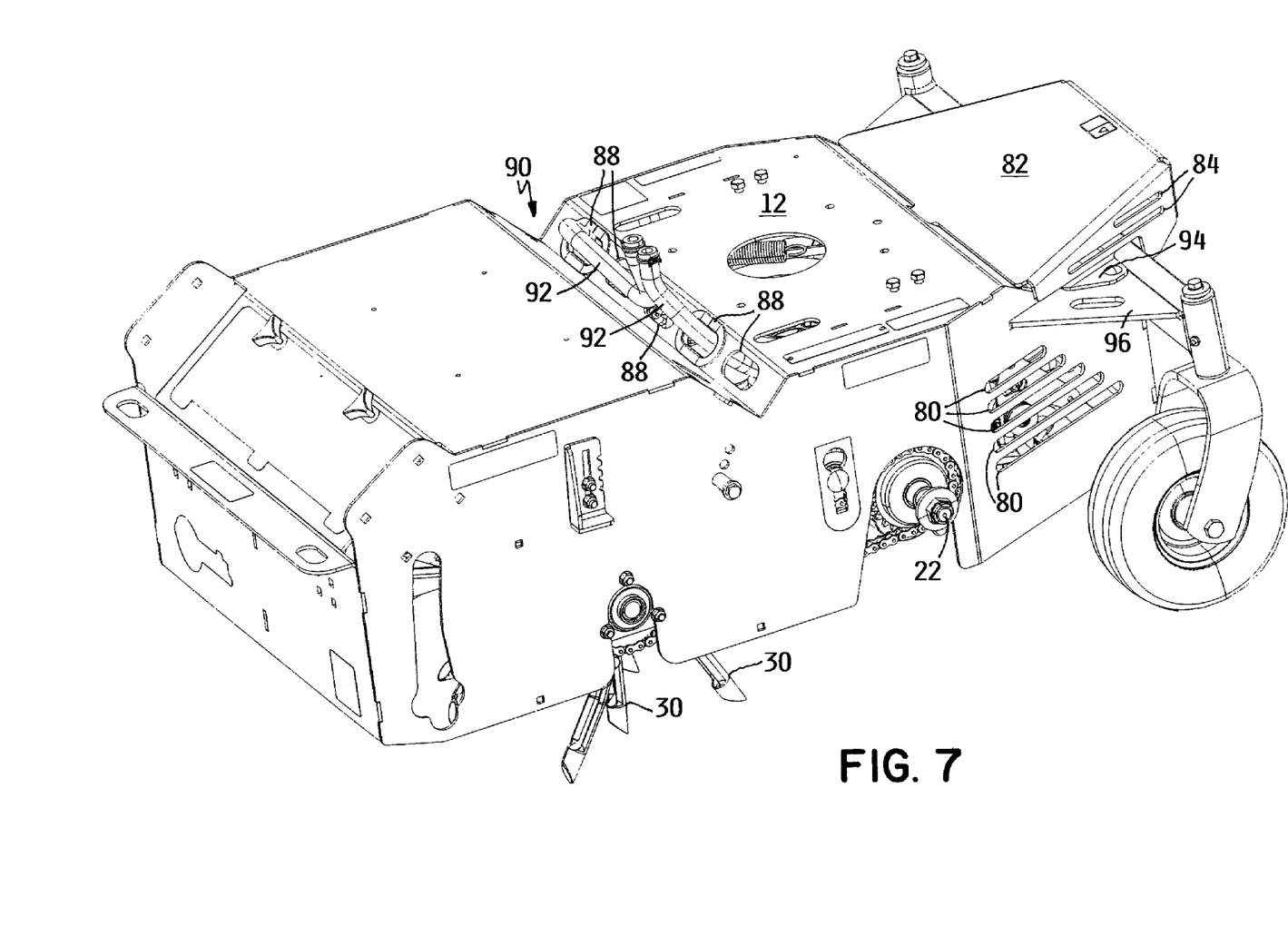
FIG. 7 is a perspective view similar to FIG. 5 but from the rear of the aerator rather than the front, particularly illustrating the rear cooling vents in the aerator housing that facilitate air flow in a fore-and-aft direction through the front portion of the internal cavity in the housing.

Referring now to FIGS. 5-7, another feature of the exemplary embodiment of aerator 2 of the invention as disclosed in this application is a system of cooling vents designed to promote a cooling airflow through the front portion of cavity 18 of housing 4, namely through the portion of cavity 18 within which drives 20 are enclosed. In this respect, each hydrostatic drive 20 has a top mounted cooling fan 21 that is rotated by one or more drive belts 98 that power the drives 20 from prime mover 14. Each cooling fan 21 is directed to blow cooling air vertically downwardly over the case or body of the drive 20 underlying such fan 21 with the cooling air absorbing the heat of drive 20 and with the subsequently heated air normally being exhausted out through the open bottom of housing 4. While this generally works adequately when housing 4 is in the transport position, the Applicants discovered that it did not work adequately when housing 4 is in a lowered operational position. In a lowered operational position of housing 4, there is often insufficient clearance between the open bottom of housing 4 and the ground with the result that the airflow of the heated exhaust air out of housing 4 is drastically reduced. Without the ability to effectively exhaust the hot air from around drives 20, hot air builds up in housing 4, causing drives 20 to overheat.

One embodiment of the cooling vents of this invention includes a series of substantially horizontal, vertically spaced, elongated, first side vents 80 on the front portions of each side wall of housing 4. Each series of first side vents 80 is placed in each side wall of housing 4 to be substantially adjacent the outer side of one of the drives 20. In addition, housing 4 includes an upper, front hood 82 located substantially immediately forward of prime mover deck 12. The side walls of hood 82 each have a plurality of substantially horizontal, vertically spaced, elongated, second side vents 84 provided thereon. In addition, hood 82 has a plurality of substantially horizontal, vertically spaced, elongated front vents 86 provided on a front face thereof.

All of the vents on hood 82, both second side vents 84 and front vents 86, are located in advance of the rotational axes of cooling fans 21. Vents 84, 86 are at approximately the same vertical elevation as the vertical gap or space between the tops of the cases or bodies of drives 20 and the underside of prime mover deck 12. This is the gap or space in which cooling fans 21 are located. This permits vents 84, 86 to serve as forward air inlets that feed inlet air to cooling fans 21 by passing the inlet air into the gap or space between the tops of the cases or bodies of drives 20 and the underside of prime mover deck 12. This gap or space has a vertical height that is substantially large enough allow for optimum efficiency of cooling fans 21 and provide sufficient volumetric capacity for air flow over the tops of drives 20. In one embodiment of this invention, this gap or space has a vertical height that is preferably at least about 1.5".

Housing 4 also includes a plurality of laterally spaced rear vents 88 that are located in a trough shaped opening 90 in the top wall of housing 4 at a position immediately behind prime mover 14. Rear vents 88 are best shown in FIG. 7. Some rear vents 88 may serve as passages for hydraulic hoses 92 that supply drives 20 with hydraulic fluid, though hoses 92 are smaller than such rear vents 88 such that a portion of such rear vents 88 are left open. Other rear vents 88 are entirely open. All rear vents 88 are located substantially immediately behind and below the rear edge of prime mover deck 12. This promotes some longitudinal air flow from front to back through the front section of cavity 18 of housing 4 in the gap or space between the tops of the cases or bodies of drives 20 and the prime mover deck 12 since the incoming air flow is not trying to enter a cavity that is open only at the bottom, but is also able to flow out generally directly rearwardly from inlet vents 84, 86 through rear exhaust vents 88. Moreover, vents 80, 84, 86 and 88 are unlikely to be clogged with dirt and debris from tines 30 since cross wall 19 substantially separates and isolates the front and rear sections of cavity 18 from one another (except for small side cut-outs for passage of chain drives 32) and since vents 80, 84, 86 and 88 communicate only with the front section of cavity 18 forward of tines 30.

The Applicants have found that the entire system of cooling vents disclosed herein is quite effective in properly cooling drives 20 and preventing them from overheating. Inlet air passes inwardly through the side vents 84 and front vents 86 in hood 82 to be directed substantially immediately to cooling fans 21. A significant portion of such inlet air is captured and directed downwardly by fans 21 over drives 20 to absorb heat therefrom. Such heated air is then effectively exhausted from housing 4 both through the open bottom housing 4 and, if need be, through at least some of the side vents 80 in the side walls of housing 4. The proportion of air in the downwardly directed flow from cooling fans 21 that is exhausted through side vents 80 depends upon how close to the ground the housing 4 is in its operational position and how much of the open bottom of housing 4 is effectively blocked off as a result. Side vents 80 thus function both to serve as exhausts for the heated air in some circumstances as well as inlets for cooling air in other circumstances. In addition, another portion of the inlet air from vents 84, 86 passes directly rearwardly over the tops of drives 20 and out through rear vents 88 to eliminate any heat accumulation at the back of the front section of cavity 18 in which drives 20 are housed. The cooling effect of all the vents is additionally enhanced by elevating the underside of prime mover deck 12 above the tops of the cases or bodies of drives 20 to the distance noted earlier, e.g. at least about 1.5", which additionally helps space prime mover 14 and thereby the heat generated by prime mover 14 further away from drives 20.

Finally, it should be noted that hood 82 is made to be selectively removable. Hood 82 includes outwardly extending attachment flanges 94 on the side walls thereof which are designed to be bolted in place to similar flanges 96 on the side walls of housing 4. When hood 82 is unbolted from housing 4 and pulled out forwardly to remove hood 82 from housing 4, the space beneath prime mover deck 12 of the top wall of housing 4 that mounts prime mover 14 is now open and accessible from the front of housing 4. This is depicted in FIG. 6. This provides sufficient access to the tops of drives 20 to allow the user to replace the drive belt(s) 98 that mechanically power drives 20 from prime mover 14 since drives 20 do not themselves have to be removed from housing 4. Normally, hood 82 is always in place on housing 4 except for when belt replacement is required.

Various modifications of this invention will be apparent to those skilled in the art. The description of aerator 2 as contained earlier in this Detailed Description is only that of various preferred embodiments. Other embodiments may be utilized and structural changes may be made in the preferred embodiments without departing from the scope of the present invention. Thus, the scope of this invention is to be limited only by the appended claims.

The invention claimed is:

1. A walk aerator for soil aeration of the ground, which comprises:

(a) a housing supported for rolling over the ground by a plurality of ground engaging wheels, the housing having an upwardly extending handle assembly which is capable of being gripped by a user who walks on the ground during operation of the aerator, the housing having a downwardly opening cavity;

(b) a prime mover carried on the housing for providing power;

(c) a plurality of aerating tools movably carried on the housing within a first section of the cavity and operatively connected to the prime mover, the aerating tools engaging the ground and creating soil aeration openings in the ground as the housing rolls over the ground;

(d) at least one air cooled traction drive carried on the housing within a second section of the cavity, the at least one drive being operatively coupled to the prime mover and to at least one of the ground engaging wheels to self-propel the housing over the ground, wherein the drive includes a top mounted cooling fan positioned in an upper portion of the second section of the cavity with the cooling fan being arranged to blow air substantially downwardly over the at least one drive; and (e) wherein the housing contains various vents therein in communication with the second section of the cavity to provide sufficient air flow both into and out of the second section of the cavity to adequately cool the drive, and wherein the vents include a first plurality of vents in advance of the cooling fan and a second plurality of vents behind the cooling fan.

2. The aerator of claim 1, wherein the first and second sections of the cavity are substantially separate from one another.

3. The aerator of claim 2, wherein the first and second plurality of vents communicate substantially only with the second section of the cavity.

4. The aerator of claim 3, wherein the first and second sections of the cavity are front and rear sections of the cavity, respectively.

5. The aerator of claim 1, wherein the first and second plurality of vents are placed at an elevation in the housing that is approximately the same as an elevation of the cooling fan within the housing.

6. The aerator of claim 1, wherein the first plurality of vents comprise a plurality of side vents and front vents placed in side walls and in a front wall of a hood portion of the housing, the hood portion of the housing extending substantially immediately forward of and above the cooling fan.

7. The aerator of claim 6, wherein the hood portion of the housing is removable from the housing to provide access to the cooling fan and to the top of the at least one drive.

8. The aerator of claim 1, further including a third and fourth plurality of vents placed on opposite side walls of the housing vertically beneath the first and second plurality of vents and adjacent to the at least one drive.

9. The aerator of claim 1, wherein the prime mover is mounted atop a prime mover deck that forms a portion of a top wall of the housing with the prime mover deck overlying the at least one drive motor and portions of the second section of the cavity, and wherein the first plurality of vents are located in advance of the prime mover deck and the second plurality of vents are located behind the prime mover deck.

10. The aerator of claim 9, wherein a top surface of the at least one drive is spaced below an underside of the prime mover deck by a vertical gap that is sufficiently large to allow for optimum efficiency of the cooling fan, to provide sufficient volume for air flow over the top of the at least one drive, and to space heat generated by the prime mover away from the at least one drive.

11. The aerator of claim 1, wherein the at least one drive comprises a hydrostatic transmission that incorporates a hydraulic motor.

* * * * *